3 Sheets—Sheet 1.
L. GODDU,
Assignor, by mesne assignments, to G. McKay, principal Trustee, and J. W. Brooks, Associate Trustee of The McKay Metallic Fastening Association.
Pegging Machine.
No. 9,315. Reissued July 20, 1880.
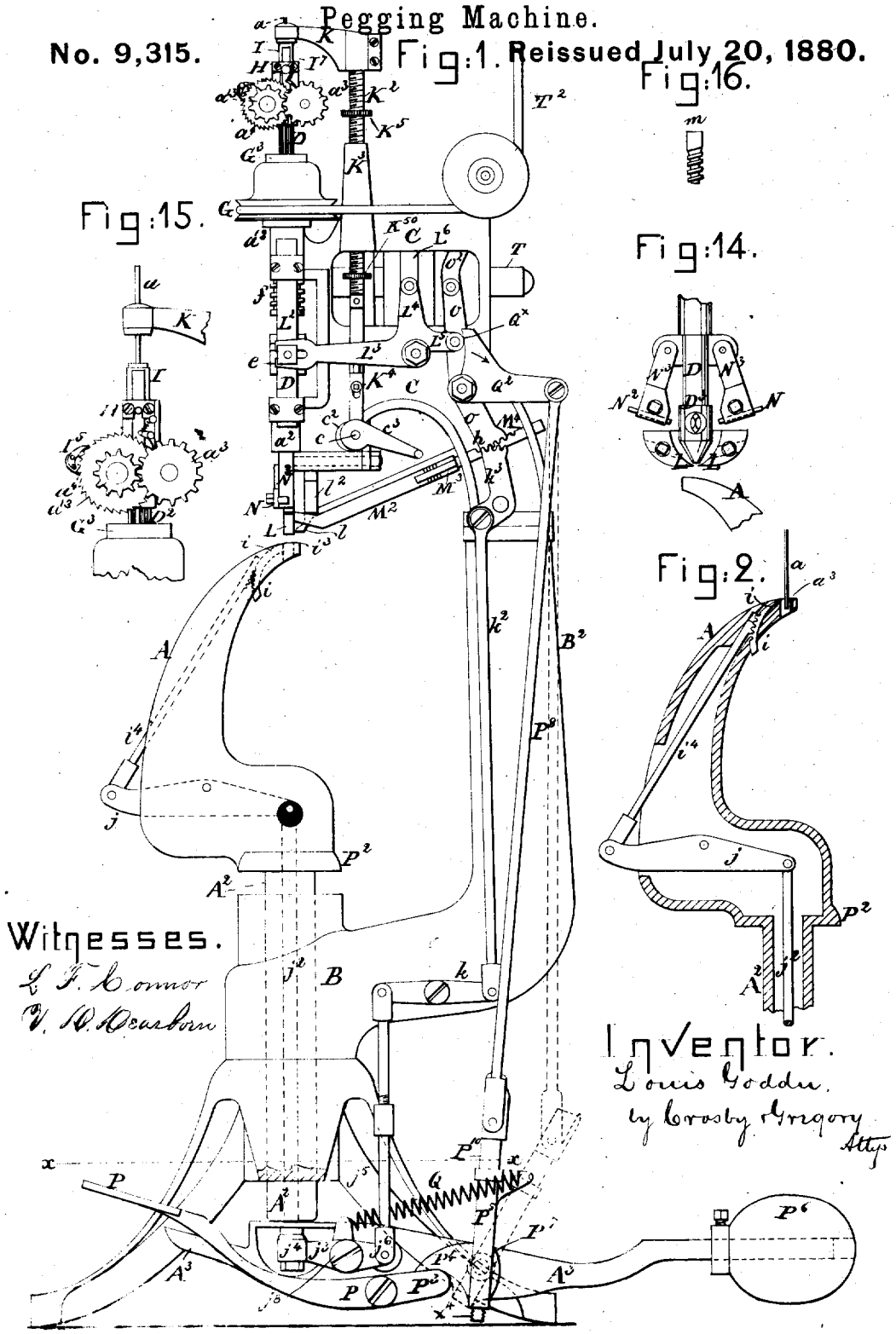
Witnesses.
L. F. Connor
V. A. Dearborn
Inventor.
Louis Goddu.
by Crosby & Gregory
Attys 3 Sheets—Sheet 2.
L. GODDU,
Assignor, by mesne assignments, to G. McKay, principal Trustee, and J. W. Brooks, Associate Trustee of The McKay Metallic Fastening Association.
Pegging Machine.
No. 9,315. Reissued July 20, 1880.
Fig: 3.
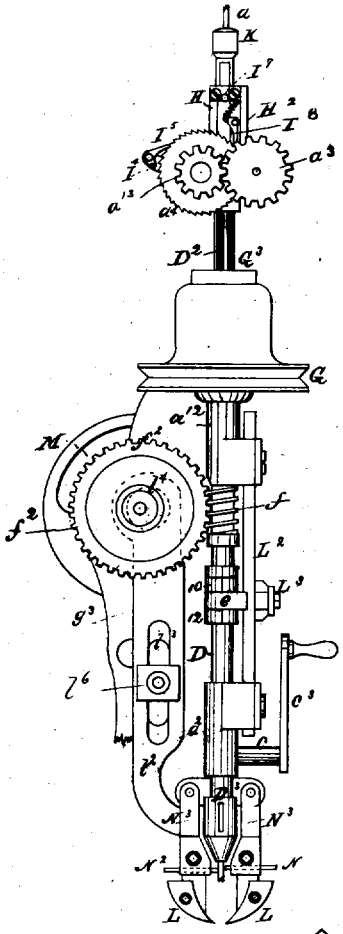
Fig: 4.
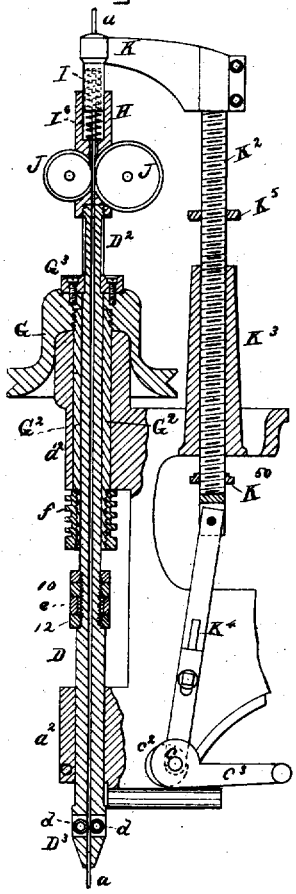
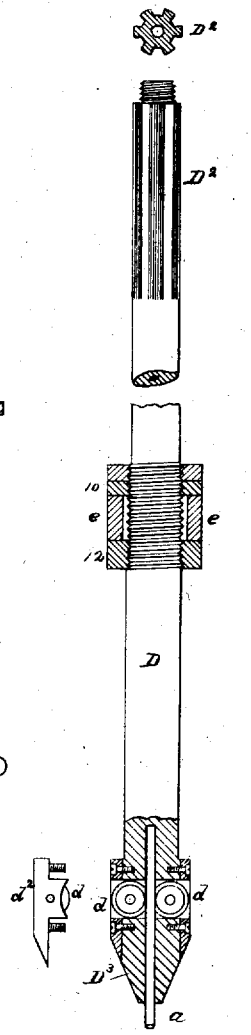
Fig: 5.
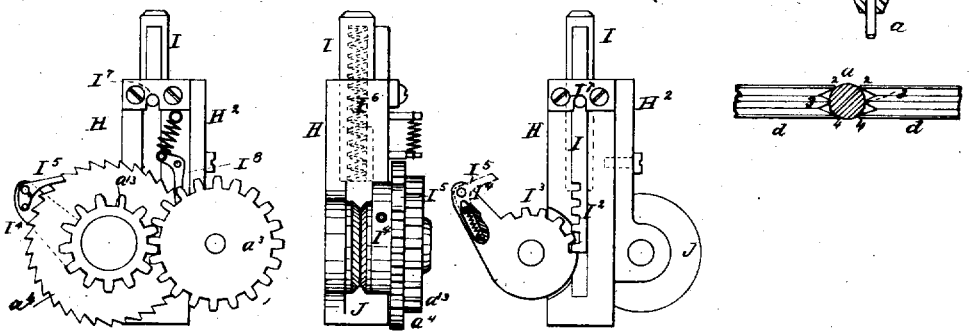
Witnesses—
L. F. Connor.
R. D. Dearborn.
Inventor—
Louis Goddu
by Crosby & Gregory Attys 3 Sheets—Sheet 3.
L. GODDU,
Assignor, by mesne assignments, to G. McKay, principal Trustee, and J. W. Brooks, Associate Trustee of The McKay Metallic Fastening Association.
Pegging Machine.
No. 9,315. Reissued July 20, 1880.
Fig: 8.
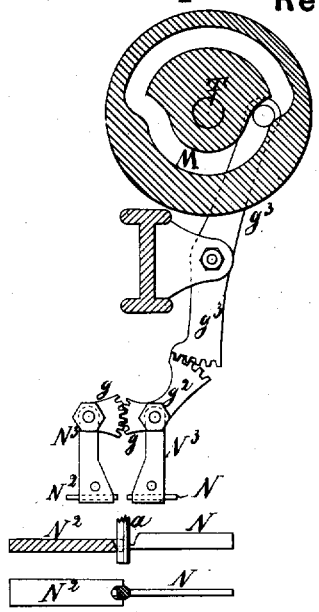
Fig: 9.
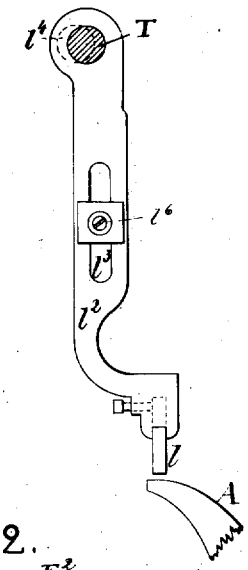
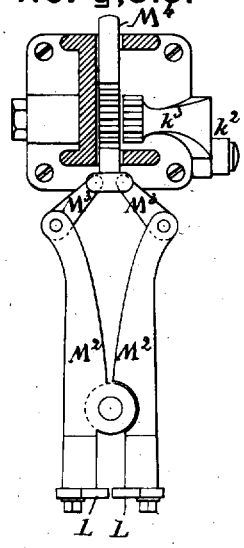
Fig: 11.
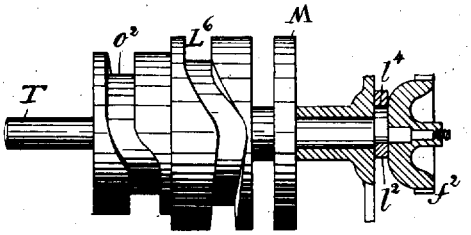
Fig: 12.
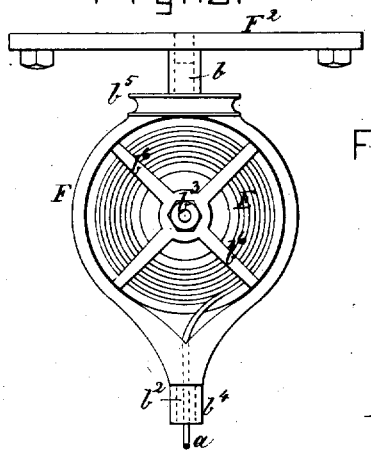
Fig: 13.
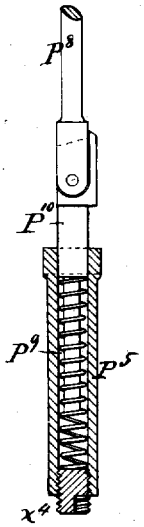
Fig: 10.
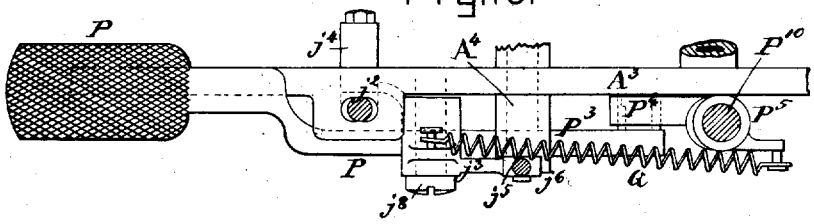
WITNESSES.
L. F. Connor
W. D. Dearborn.
INVENTOR.
Louis Goddu,
by Crosby & Gregory
Attys.

UNITED STATES PATENT OFFICE.

LOUIS GODDU, OF BOSTON, ASSIGNOR, BY MESNE ASSIGNMENTS, TO GORDON McKAY, OF CAMBRIDGE, PRINCIPAL TRUSTEE, AND JAMES W. BROOKS, OF CAMBRIDGE, MASSACHUSETTS, ASSOCIATE TRUSTEE, OF THE McKAY METALLIC FASTENING ASSOCIATION.

PEGGING-MACHINE.

SPECIFICATION forming part of Reissued Letters Patent No. 9,315, dated July 20, 1880.

Original No. 171,609, dated December 28, 1875. Application for reissue filed May 11, 1880.

*To all whom it may concern:*

Be it known that I, LOUIS GODDU, of Boston, in the county of Suffolk and State of Massachusetts, have invented certain new and useful Improvements in Screw Cutting and Inserting Machines for Fastening the Soles to the Uppers of Boots and Shoes; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

In machines of this kind hitherto constructed the screws have been cut in a continuous manner upon the wire, and while being so cut are screwed or entered into the work to unite the parts. In such method, however, the screws cannot have solid heads.

It is one of the essential features of my invention to so form the screws that the thread of each shall terminate in a solid head by the severance of each screw from the wire at a point just above the termination of the thread after the screw has been entered into the parts to be united by it. The thread, however, is formed and completed previous to the operation of entering the screw into the stock. This plan overcomes objections hitherto existing, such as heating the wire under the simultaneous operations of cutting the thread and inserting the screw.

In the organization of this machine the cutters are so constructed and operated as to make the severance of the inserted screw close to that part of the sole upon which the cutters rest, thus saving waste over the modes hitherto practiced.

With a machine for forming and inserting solid-headed screws made from a continuous length of wire carried by an intermittently vertically-moving spindle I have combined a cutter to operate within and at the upper surface of the horn or other work-support, the purpose of which is to cut off the surplus length of the screw which projects through the inner sole into an opening in the horn, thus leaving the surface of the inner sole perfectly free from projecting screws.

The action of the cutter located in the horn is simultaneous with that of the knives which sever the screws from the wire, and the action of both must necessarily precede the feed of the work upon the horn.

The cutters for severing the wire above the work are so located with relation to the work and the direction of the feed as to reciprocate or vibrate in a plane parallel with the direction of the movement of the feed and of the shoe acted upon by the feed, and the cutters are so supported and attached to their actuating or carrying levers as to extend, as shown, below the arms or levers to which the said cutters are attached.

The alternate grasping and releasing of the wire within the spindle, to give it a revolving motion to cut the thread and screw it into the work, is a serious objection, which my machine entirely remedies, for the wire is herein held and made to turn with the spindle during the entire operation of the machine, but without at all times cutting into its surface. The devices by which to accomplish these results are very simple in construction and operation.

In connection with the devices to give to the wire its rotary motion and allow it to move in the direction of its length, I employ a feeding device of peculiar construction to feed the wire for the successive formation of screws, while the device that engages the wire to turn it remains in full force—that is to say, does not relax its hold on the wire. This feeding device consists, primarily, of a vertically-movable section of the wire-carrying spindle, and fulfills its function by the employment of a stop mounted upon the head, the stop having the capacity of varying and determining the feed of the wire to form and cut different lengths of screws.

In connection with the vertically-movable horn I employ a compound weighted treadle, upon which the horn rests, the treadle being provided with a knee-joint, a spring-connection, and an operating-cam, whereby I obtain a cushioned or yielding support for the horn, the knee-joint being flexed when it is desired to lower the horn to place or remove the work.

The wire is fed to the spindle from a spool having a compound motion, one motion to unreel the wire and the other to turn in unison with the spindle, which is always griped upon the wire.

In the accompanying drawings, Figure 1 represents an elevation of the right side of a screw cutting and inserting machine embracing my invention for fastening the soles and uppers for boots and shoes, the spindle being raised; Fig. 2, a vertical central section through the horn and its interior cutter; Fig. 3, an enlarged front view of the head, showing the feeding, chasing, and severing devices with the spindle at the limit of its ascent, the wire being extended through the nose of the spindle, where the chasers are closed upon it to cut the thread as the wire is fed down, the cutters for severing the screw being open; Fig. 4, a vertical section of the wire-carrying spindle and some of its connected devices, together with the adjustable stop to vary and determine the feed of the wire; Fig. 5, enlarged sectional details in different positions of the feeding device; Fig. 6, an enlarged sectional view of the spindle detached, showing the wire-griping rolls and the manner in which they bear upon and cause the wire to turn with the spindle; Fig. 7, a horizontal sectional view of the head, showing the wire-severing cutters and their toggle-connection; Fig. 8, a sectional elevation, showing the means for operating the chasers; Fig. 9, the work-feeding device, showing its position with relation to the horn; Fig. 10, a horizontal sectional view, showing the compound treadle, the section being on line $x\,x$, Fig. 1; Fig. 11, a view of the principal operating-cams; Fig. 12, the pivoted spool-frame for the wire and its holder; Fig. 13, the knee-joint and its spring; Fig. 14, a view showing the spindle, screw-chasers, and severing-cutters open, the spindle being at its lowest position. Fig. 15 shows the wire-feeding device in its lowest position with respect to the stop gage; and Fig. 16, a screw such as made by the machine, the point of the screw being broken off.

The revolving work-supporting horn A and its treadle-connections are mounted in a base, B, and the head C, which carries the screw cutting and inserting mechanism, is secured upon the base-standard $B^2$, so that the wire-carrying spindle D will operate in line with the axis of the horn and its work-supporting tip. The spindle D is hollow, and forms a guide for the wire from which the screws are made.

The spool E, (see Fig. 12,) from which, in practice, the wire will be taken to the rotating spindle, which grasps and rotates the wire with it, has its axis $b^3$ in a frame, F, supported by vertically-placed pivot-bearings $b\,b^2$ of a bracket, $F^2$, attached to the ceiling. The bearing $b^2$ runs in a socket, $b^4$, of the bracket-frame, and serves as a guide for the wire on its way to the spindle, and is located coincident with its axis of rotation. The spool-frame is revolved by a suitable belt on a pulley, $b^5$, and one side of the spool has a removable disk, $b^6$, to permit the application of a coil of wire to the spool, a nut and spiral spring being employed to hold the spool with more or less force. The wire and spool being supported above the machine relieves the machine from the weight of the coil of wire and spool, reduces friction, and avoids liability of breaking the head. The spool turns on its horizontal axis at the same time that the spool-frame is revolved about its vertical axis. The spindle D, held at its lower end in a guide, $a^2$, and placed in the sleeve $G^2$, has its upper end corrugated or ribbed, as at $D^2$, Fig. 6, to engage a cap, $G^3$, attached to the pulley G, screwed upon the said sleeve $G^2$, which is fitted within the upper guide, $a^{12}$. (See Fig. 4.) This construction permits the spindle to be raised and lowered as it is being rotated continuously, the ribs being long enough to allow the necessary vertical movement of the said spindle to feed down the wire for and insert the screw.

The wire-feeding device is composed, essentially, of a pair of rollers, J J, circumferentially grooved or corrugated, or scored, as in Fig. 5, to engage the wire without slipping thereon. The rolls have their bearings in a holder, H, and plate $H^2$, adjustably attached to the said holder by a screw, to thus enable the rolls to be adapted to the wire being used and take out bends. The holder H is attached to the spindle D at its upper end, so that the opening between the rolls and central passage through the spindle correspond.

A slide-rod, I, provided with a central opening for the wire $a$, and having at one side of it rack-teeth $I^2$, (see Fig. 5,) is fitted into an opening at the top of the holder H, and is normally held up by a spring, $I^6$. As the upward movement of this rod I with the spindle D is intermittingly interrupted by the action of the said rod against the stop or arm K, to be hereinafter described, its teeth in engagement with the teeth of the toothed segment $I^3$, mounted loosely on the axis of one of the feed-rollers J, move the said segment and cause a pawl, $I^5$, carried by its arm $I^4$, (see Fig. 5,) to engage and actuate the ratchet-wheel $a^4$ fixed to the shaft of one of the said wire-feeding rollers J, causing the toothed gear $a^{13}$ thereon to engage the gear $a^3$ fixed upon the shaft or axis of the opposed wire-feeding roller, causing the two rollers to be moved in unison. When the slide-rod I is being lifted by the spring $I^6$ the segment is turned back and the pawl $I^5$ slips over the teeth of the ratchet, but does not move the wire-feeding rollers J. The detent $I^8$ holds the ratchet $a^4$ and prevents any retrograde motion of the wire-feeding rollers by reason of strain on the wire, as when the screw is being inserted into the work. The extent of upward motion of the slide-rod is controlled by a pin, $I^7$, (see Fig. 5,) that meets a cross-plate or fixed part of the holder H.

The arm K, the position of which regulates the extent of movement of the wire-feeding rollers J, is denominated by me as the "feed-governing stop" for the wire. This stop has an opening at one end to surround the wire *a*, as shown, just above the slide-rod I. The stop is carried at the upper end of a threaded rod, $K^2$, located within the guide $K^3$ connected with the frame-work.

The foot of the rod $K^2$ has an attached adjustable link, $K^4$, shaped to embrace an eccentric hub, $c^2$, the journal or pin *c* of which has attached to it a crank-like handle, $c^3$, by which to turn the pin and cause it to raise and lower the rod $K^2$ and place the stop in a more or less elevated position, to be struck by the end of the slide-rod I as the spindle is raised, the position of the said arm K determining the length of the screw to be made and inserted. The set-nuts $K^5$ $K^{50}$ on the rod $K^2$ are, in practice, so located on the said rod and with relation to the guide $K^3$ as to determine by the space between them and the said guide the minimum and maximum length of screw or fastening. The position of the nut $K^5$ on the rod $K^2$, it being drawn down to rest upon the guide $K^3$, gives the maximum length of screw or fastening, for the stop is then in its lowest position and the feed movement is the greatest, and the nut $K^{50}$, when it bears upon the lower end of the said guide, insures the feeding of the wire for a screw of the minimum length. Any length of fastening between these two is placed under the control of the operator by means of the lever $c^3$, before described, and the eccentric hub.

The spindle D, somewhat enlarged at its lower end, and slotted to receive the small holding-rollers *d*, grooved to grasp and firmly hold the wire and cause it to turn in unison with the spindle, has connected with it the adjustable bearings *d'* (see Fig. 6) for the said rolls *d*.

The construction of the acting-edges of the rollers *d* is shown clearly in Fig. 6. The edges 2 3 4 bear upon the wire *a* at each side of it. The edge 3 is located at the least distance from the axis of the wheel *d*. To enable the wire-severing cutters to cut the fastenings or screws near the point of the spindle-nose the latter is made conical.

The spindle D, surrounded by the loose collar *e*, connected with the slide $L^2$, and provided with two adjustable nuts, 10 12, is raised and lowered at the proper times by the collar *e* striking the said nuts, as the said collar and slide $L^2$ are moved by the lever $L^3$, herein shown as a three-armed lever, one arm of which is provided with a roller-pin to enter a groove in the cam $L^6$ on the cam-shaft T, rotated through the instrumentality of the worm-gear $f^2$ on the said shaft, (see Figs. 3 and 11,) which is engaged and driven by the worm *f* on the inclosing-sleeve $G^2$, (see Fig. 4,) before described, which is revolved by the driven belt $T^2$.

The adjustable screw-chaser N and the opposed adjustable notched support or rest $N^2$ for the wire, shown separately in Fig. 8, and located above the severing-cutters L, are carried by vibrating arms $N^3$. If desired, a chaser may be substituted for the support $N^2$. The axes to which the arms $N^3$ are attached are provided with toothed segments *g* $g^2$, in engagement with each other, and are actuated by the toothed lever $g^3$ vibrated by the groove of the cam M, it being shaped, as shown, so as to simultaneously move the arms and their attached cutters toward and from each other at the proper times to give to the screw or fastening its proper shape from end to end. The wire-severing cutters L, located below the chaser and so moved and operated as to sever the screw or fastening through the main body of the wire above the threaded part or body, so as to form a head shaped as shown in Fig. 16, are connected with vibrating levers $M^2$, (see Fig. 7,) pivoted at the under side of the machine-head. These levers are closed at the proper time to sever the inserted wire or screw next that part of the material of the sole upon which the cutters rest, and at a point just below the nose of the spindle D when most depressed. The screw is cut off sufficiently close to avoid subsequent filing. The said cutters, made detachable and of any desired construction, are shown attached by clamp-screws, and may be easily replaced by others or removed to be sharpened. Each cutter has a rib at its rear side to enter a groove in its arm $M^2$, the rib and groove preventing the cutters twisting out of position.

The arms $M^2$ are connected by links $M^3$ with a toothed slide, $M^4$, engaged by a toothed segment, *h*, (see Fig. 1,) at the end of a lever, O, pivoted to the head C, a roller-pin at the opposite end of the lever entering a groove in the lever-actuating cam $O^2$, of such shape as to cause the cutters to operate at the proper times.

The horn A, having its tip located in line with the center of the spindle D, has its stem $A^2$ extended through the standard B and mounted upon a treadle, $A^3$, pivoted at $A^4$. Pivoted upon this treadle is an auxiliary treadle, P, the short arm of which has a projection or finger extended under an arm, $P^4$, connected with a socket-piece, $P^5$, pivoted upon the main treadle $A^3$ at $P^7$.

In this machine the head C remains fixed, while the horn is left free to rise and fall to adapt it to the varying thickness of the material to be united. A shoulder, $P^2$, at the base of the horn, in connection with a bearing on the standard, determines the descent of the horn. The weight $P^6$ may be adjusted to regulate the upward pressure of the horn. The pivoted socket $P^5$, containing a spring, $P^9$, (see Fig. 13,) receives within it the lower member, $P^{10}$, of a toggle-jointed rod or connection, $P^8$ $P^{10}$, the said connection being normally kept straight by a spring, Q. The upper part, $P^8$, of this jointed rod or connection, at its upper end, is connected with a pivoted elbow-lever, $Q^2$. (See Fig. 1.) The other arm of this lever has a curved or inclined face to be acted upon by the projecting end $L^5$ of the spindle-reciprocating lever $L^3$, hereinbefore described.

The first part of the downward movement of the spindle D is made available in threading the wire and the latter part of its descent to insert the threaded screw. While the screw or fastening is being inserted in the stock the part $L^5$ of the lever $L^3$ is made to act upon the face of the upper arm or lever, $Q^2$, near its upper end, $Q^\times$, which is so shaped as at that time to turn the lever to its farthest extent in the direction of the arrow on it, causing the jointed connecting-rod $P^8$ $P^{10}$, then held straight, to act upon and compress the spring $P^9$ in the socket $P^5$. The force exerted on the lever $A^3$ by this compressed spring maintains the said lever in position with the horn elevated or borne against the stock with sufficient force to resist the downward pressure of the spindle while inserting the screw or fastening. At this time the horn is, it will be noticed, supported by, and its greatest upward pressure is controlled by, the spring $P^9$. This increased resistance of the horn against the downward thrust of the screw or fastening being inserted in the stock prevents the horn receding.

After the screw or fastening is inserted and the spindle partially raised, and just before the shoe-feeding device operates, the said increased resistance or upward pressure of the horn is relaxed by the passage of the end $L^5$ of the lever $L^3$ below the inclined portion $Q^\times$ of the lever $Q^2$, before described, that controlled the duration and extent of compression given to the spring, thus permitting the spring $P^9$ to again expand, leaving the horn free to descend sufficiently, while the shoe-feed *l* operates, to permit the shoe to be easily moved for the proper distance over the horn. Releasing the horn in this way prevents marring the work as the feed *l* strikes it, and obviates the displacement of the inner sole. This increased resistance of the horn is made effective only during the downward thrust of the screw or fastening, and as it is in contact with and is being inserted in the stock or sole. The screw $X^4$, (see Fig. 13) that supports the lower end of the spring $P^9$, may be adjusted to increase or lessen its effective force.

To place the work upon or remove it from its support the latter needs to have a considerable range of vertical movement, and to prevent the too great and violent compression of the spring $P^9$, by the treadle as the horn or support is so depressed I have provided the short auxiliary treadle P to act upon and turn the pivoted spring-holding socket $P^5$ into the position shown in dotted lines, Fig. 1, thus breaking the joint in the rod $P^8$ $P^{10}$, leaving the spring $P^9$ comparatively free.

A spring, Q, moves the socket in the opposite direction to straighten the joint as soon as the horn or support is elevated.

When the auxiliary treadle is depressed sufficiently to turn the socket, as described, and relieve the spring $P^9$, it comes in contact with the main treadle $A^3$, on which the horn rests, and thereafter both treadles continue their descent together until the horn is sufficiently lowered to remove and replace the work, after which the foot is removed and the horn is permitted to rise under the action of the treadle, the horn surface or tip adjusting itself automatically into proper position, according to the thickness of the work between it and the cutters above the work or its variations in thickness when changing from the ball to the shank of the sole, and vice versa.

The horn has attached to and so as to move freely with it in a guide-passage therein a cutter, *i*, shown curved, and provided with rack-teeth to be engaged by the teeth of a sliding rod, $i^4$, attached to the lever *j* pivoted upon the horn, the opposite end of the said lever being connected with a rod, $j^2$, passed through an axial opening in the stem $A^2$ of the horn. The lower end of this rod $j^2$, extended through an opening in the main treadle $A^3$, is loosely connected with one end of a lever, $j^3$, pivoted upon the main treadle at $j^8$. The opposite end of the said lever $j^3$ is joined by a pin, $j^6$, coincident with the center of motion $A^4$ of the main lever $A^3$, with an adjustable link, $j^5$, attached to a pivoted lever, *k*, connected by link $k^2$ with the toothed elbow-lever $k^3$, engaged and actuated at the proper times by the lever O, before described, to thus actuate the cutter *i* through the connected train of levers, links, and rods, and cause it to be moved forward across the small vertical opening at the end of the horn, in which rests the end of the screw or fastening inserted into the shoe through the inner sole, to thus enable the said cutter to remove the protruding end of the said screw flush with the inner sole.

The cutter *i* works against a steel block, $i^3$, set into the said horn-passage. The cutters *i* and L operate at the same time to sever the screw or fastening from the wire and remove its protruding inner end.

The two arms of lever $j^3$ are of equal length, and the rod $j^5$ being connected with it coincident with the center of motion of the treadle $A^3$, movement of the latter when working the horn will not affect the said cutter *i*.

The work is fed the proper distance, just after cutting off the screw or fastening, by means of the shoe or work feeding device or foot *l*, (see Fig. 9,) of suitable shape, adjustably attached by a screw to the lower end of a feed-lever, $l^2$, slotted at $l^3$ to vibrate over an adjustable fulcrum, $l^6$, to thus enable the extent of the feed movement to be varied at will. The feed-lever $l^2$ is vibrated by means of an eccentric, $l^4$, near the front end of the shaft T.

The feed-foot *l* is located at the rear of the cutters L, just above the end of the horn, and has imparted to it an ellipsoidal movement to engage and release the shoe, as commonly done in sewing-machines.

I have given a specific description of the several operating devices of this machine; but as my invention comprehends a broader principle than mere construction, I do not, therefore, wish to be confined to the specific.

details described, but to vary the same so long as the essential combinations and results described are obtained.

In operating the machine the horn is depressed by the treadle $A^3$, and the work is placed on it. Then the treadle is released and the horn rises, bringing the work against the cutters L, which are to subsequently sever the threaded wire after it has been inserted into the stock by the rotating spindle D and its connected griping devices, thus forming from the wire a screw of the proper length. Assuming the spindle to be at its highest point of elevation, as shown in Fig. 3, with wire enough to form one screw projecting below it, and power applied to operate the machine, the screw-chaser N and the wire-support $N^2$ are brought in position to act upon the wire and cut a thread upon it as the wire clamped, as described by the rollers *d*, is rapidly rotated continuously in one direction by the spindle, it in the meanwhile being made to descend at a speed proportional to the number of screw-threads desired to the inch until a length sufficient for one screw has been formed, after which the arms $N^3$, carrying the chasing device and support $N^2$, open quickly to give room for the spindle to move down rapidly between them until the screw or fastening reaches the work, when the resistance of the horn in opposition to the thrust of the fastening is increased, as before described, after which the speed at which the spindle descends is the same as when cutting the thread on the wire.

The rotary and descending motions of the spindle continue until the full length of the screw is inserted and a little of the unthreaded wire is carried into the sole, when the cutters L are caused to act, severing the screw from the main length of wire flush with that part of the sole or leather on which the cutters rest, making a screw with a solid head, *m*. (See Fig. 16.) During this operation the spool E, from which the wire is being fed, revolves with the spindle.

In order that each screw may have perfect hold in the inner sole, its end is made to extend through the said sole into the opening in the nose of the horn, where the screw is clipped off by the cutter *i* close to the face of the inner sole, leaving the shoe perfectly smooth inside.

The screw or fastening having been cut off, the increased resistance of the horn is relaxed, and as the spindle D rises the foot *l* feeds the shoe in the direction of movement of the cutters L. Before the spindle D reaches its highest point of ascent the rod I, moved upward to its normal position by the spiral spring $I^6$, strikes the feed-governing stop K, which has previously been set in the required position, according to the length of screw or fastening next to be made, and arrests the upward movement of the rod I, while the spindle D continues its ascent. The rod I having reached the stop K, farther ascent of the spindle causes the teeth $I^2$ of the rod, in engagement with the toothed sector $I^3$, to move it, causing its pawl to turn the ratchet $a^4$ and turn the feed-rolls J J to feed or move beyond or below the griping-rolls *d d* enough wire for another screw or fastening, the length thereof depending upon the adjustment of the stop K, for the sooner the rod I strikes the said stop the longer will be the screw, and vice versa.

The several cams are so formed and operated as to time each device and effect the co-operation of the several parts to produce the results stated.

It must be observed that a very marked advantage results from the use of a screw formed upon and cut from a continuous length of plain wire, so as to leave a solid head of the full diameter of the wire, as such feature gives better finish, and the head, being larger than the body of the wire, holds the work more firmly in its place and prevents the screw from working in, as is well understood. In this respect my machine differs from all other screw-inserting machines known to me. The clean clipping of the inner end of the screw leaves a much smoother inner-sole bottom than can be obtained by the usual imperfect method of clinching or riveting.

Another essentially novel feature of this machine is the employment of devices to constantly gripe and rotate the wire, both when threading the wire, inserting the fastening, and when the spindle is being raised to bring down a new fastening, the said device (the rollers *d*) then rolling along over the wire with which they are in constant contact. This feature distinguishes this machine from all others.

Another highly important advantage consists in imparting to the spindle an intermittent vertical movement, whereby the wire is first threaded in plain sight of the operator and then inserted. This avoids the heating of the wire. By subjecting it to only one operation at a time the operator is enabled to see if the chasing-tool is doing its work properly, and to stop the machine before an imperfect screw is inserted. In these respects, also, this machine is of wholly novel construction.

Although I have described the machine as adapted to the manufacture of boots and shoes, yet it is obvious that it can be used to advantage in uniting the seams of hose, belting, and other similar work, and the work may be supported upon an adjustable jack, such as is used in wood-pegging machines, as my invention is not limited to that class of machines employing a rotating work-supporting horn, yet I prefer and consider it of great advantage to use such a horn. When the horn is not employed the interior cutter and its operating devices need not be used, as I shall then rely on the position of the stop K to insure the production and insertion of a screw of the proper length.

This machine is also equally well adapted for inserting screws without solid heads. In such case, however, the wire-severing cutters must be made to work quicker to sever the wire before the threaded part thereof is fully screwed into the sole. This is done by altering the times of the cams.

The horn, except when the work is being removed or applied, is at all times held pressed upward by a spring, and with this spring I have combined means to automatically vary its force, and consequently the degree of resistance of the horn, making this resistance greatest in opposition to the downward thrust of the screw or fastening, or while the screw or fastening is being inserted into the stock or sole, this increased resistance being decreased after the screw or fastening has been inserted to permit the shoe to be freely moved over the horn by the feed *l* for the reception of the next fastening. The cutters L project downward for some distance below their carrying-arms, rather than being flush with the under sides of their carrying-arms, as heretofore common; and to cut the screw or fastening from the wire after it is inserted the said cutters are made to move toward each other in a line parallel or coincident with the direction of the feed-movement of the shoe, and the line of the row of screws or fastenings to be inserted therein rather than at right angles to the direction of the feed of the shoe, as heretofore common.

I claim—

1. In a machine for uniting the soles and uppers of boots and shoes, an intermittently-reciprocating wire-carrying spindle, mechanism to co-operate therewith to cut threads on a continuous wire and form a solid-headed fastening, substantially as described, and a rotating horn or support, substantially as herein set forth.

2. In an organized machine for uniting the soles of boots and shoes, the combination, with mechanism to cut from a continuous length of wire screws with solid heads and insert them, of an automatic vertically-adjustable horn or work-support, substantially as herein set forth.

3. In a machine to cut screws from a continuous length of wire, form solid heads for the screws, and insert them in the uppers of boots and shoes, the rotating work-supporting horn, interior cutter, and means, substantially as described, adapted to operate it automatically to clip off the inner ends of the inserted screws, substantially as set forth.

4. The combination of an automatic vertically-adjustable work-support with an interior cutter operating automatically to clip the inner ends of the screws at whatever height or position the support may occupy with respect to the head, substantially as herein set forth.

5. The combination of a revolving wire-carrying spindle, D, with a continuously griping and holding device for the wire carried thereby and an automatically-adjustable work-support, substantially as herein set forth.

6. A continuously griping and holding device for turning the wire while cutting the thread and inserting the screw, consisting of rolls *d d*, having annular seizing-edges, in combination with a continuously-revolving wire-carrying spindle, D, whereby the wire, while being griped, is free to be moved in the direction of its length, substantially as herein set forth.

7. The combination, with a revolving wire-carrying spindle provided with a continuously griping and holding device for the wire near the end of said spindle, of an enlarged head and cone-point forming the end of the spindle, whereby the wire is griped near the screw and supported to prevent it being twisted off while being inserted.

8. The combination, with a work-support and a revolving wire-carrying spindle provided with a feeding device, of a movable rod carried by the spindle and a stop, K, with which it co-operates, to enable the rod to actuate the wire-feeding mechanism, substantially as herein set forth.

9. The combination, with a rotating work-supporting horn and a revolving wire-carrying spindle provided with a yielding rod, I, to operate the wire-feeding devices, of an adjustable stop, K, whereby screws of different lengths may be inserted in the work without arresting the movement of the machine, substantially as herein set forth.

10. The combination, with a wire-carrying spindle having both a rotating and vertical movement and its wire griping and holding devices, of wire-feeding devices at the upper end of the spindle, said feeding devices consisting of a yielding wire-guiding rod, I, provided with rack-teeth $I^2$, toothed pawl, lever $I^4$, and feed-rolls *d d*, operated thereby, whereby the wire is fed by the descent of the said rod and left unaffected by its ascent, substantially as herein set forth.

11. The revolving wire-carrying spindle and its feeding and griping devices, combined with screw chasing or threading devices, to cut screws of varying lengths, substantially as described, and opening and closing arms carrying the screw-chaser and wire-support, substantially in the manner herein set forth.

12. The revolving wire-carrying spindle, wire-feeding and screw-threading devices, combined with a cam to govern the extent and time of inward and outward movement of the threading devices toward and from the center of the wire and with relation to the feed of the wire, to control the shape of the screw and the pitch of the thread, substantially as described.

13. The combination, with a revolving work-supporting horn and a wire-carrying spindle having both a revolving and vertical movement, of the screw-chaser, a wire-support, and the automatically-operating wire-severing cutters L, the said devices co-operating to form and insert a screw and cut it from the main part of the wire, substantially as described.

14. In a machine for cutting and inserting solid-headed screws from a continuous length of wire, the combination, with mechanism for effecting these results, of a work-feeding device and an automatically vertically-adjustable work-support, substantially as described.

15. The method of forming and inserting solid-headed screws cut from a continuous length of wire by the intermittent vertical motion of the wire-carrying spindle, and the co-operation therewith of intermittently-operating chasing and severing devices, whereby the wire is fed forward at proper intervals, a screw-thread cut thereon of proper length, a head formed, and the screw inserted into the stock and severed, substantially as described.

16. The herein-described process of uniting the uppers to the soles of boots and shoes by means of solid-headed screws, which consists in automatically threading the wire for a screw of the proper length, inserting it into the sole and upper, and then severing the wire above the threaded part, all substantially as described.

17. In a machine for uniting the uppers to soles of boots and shoes, the combination, with mechanism adapted to form solid-headed screws from a continuous length of wire, of cutters L, which sever the inserted screw from the main part of the wire occupied by the head, and a cutter carried by the work-support for clipping the inner end of the screw, substantially as described.

18. In a machine to unite the soles and uppers of boots and shoes by means of screws formed from a continuous length of wire inserted in the boot or shoe before the screw is severed from the wire, the horn, its curved cutter $i$, provided with teeth, combined with the toothed rod $i^4$, lever $j$, and central rod, $j^2$, the latter being timed in its cutting movement to correspond with the time of cutting the screw from the wire by the cutters L, substantially as described.

19. The horn, the treadle $A^3$ to support it, and means to increase the resistance of the horn, as described, in opposition to the thrust of the fastening, combined with the auxiliary treadle P, pivoted to the main treadle, and adapted to break the joint in the connecting-rod $P^{10}$ $P^{10}$, substantially as described.

20. The combination, with the rotating work-supporting horn and a cutter, $i$, carried thereby, of the connected pivoted arm $j^3$, having its pivot-connection $j^6$ between the cutter-operating devices and main treadle, coincident with the pivot $P^7$ of the said treadle, whereby the action of the cutter $i$ is kept wholly independent and unaffected by the movement of the horn or treadle.

21. In combination, the auxiliary treadle P, pivoted to the main treadle $A^3$, as described, the pivoted socket or arm $P^5$, the spring $P^8$, and the jointed connecting-rod to be sprung or broken by the auxiliary treadle, substantially as described.

22. In a machine for uniting the uppers to the soles of boots and shoes from a continuous length of wire, the combination, with a spindle having a revolving and vertical movement and carrying a wire-griping device which has a continuous hold upon said wire, of a rotating work-supporting horn having an opening, $i^3$, in line with the inserted screw, and a cutter, $i$, to clip the screw end extended below the surface of the horn or support.

23. The combination, in a machine for uniting the uppers to the soles of boots and shoes from a continuous length of wire fed through a spindle having an intermittent vertical movement, of a screw-chaser, N, and a wire-support, $N^2$, operated to close upon the wire and to be carried therefrom by simultaneous movements, produced in the manner herein set forth.

24. In a machine for uniting the uppers to the soles of boots and shoes from a continuous length of wire, the combination, with a spindle having a revolving and vertical movement, and in which the wire is continuously griped to turn it therewith, of an independent wire-holding spool, E, adapted to be revolved to unreel the wire and to be turned with and in the direction of rotation of the spindle, whereby the wire is prevented from being twisted, although the spool is separated from the machine.

25. In a machine for uniting the soles and uppers of boots and shoes, cutters having an opening and closing movement in the direction of the feed of the shoe to sever the inserted screw or fastening from a length of wire, substantially as described, combined with a horn to enter and support the shoe.

26. In a machine for uniting the soles and uppers of boots and shoes, cutters having an opening and closing movement in the direction of the feed of the shoe over its support, and connected with their carrying or actuating arms or levers, so as to project downward into open space below the said arms, substantially as described, combined with a work-supporting horn to keep the work held pressed upward as the said cutters operate, substantially as described.

27. In a machine to unite the soles and uppers of boots and shoes, a horn and means to automatically increase the resistance of the horn against the downward thrust of the fastening inserted in the stock.

28. In a machine to unite the soles and uppers of boots and shoes, the work entering and supporting horn and means to intermittingly and automatically increase its resistance against the downward thrust of the fastening being inserted, combined with the feeding device to engage and move the stock after the insertion of the fastening, while the resistance of the horn or its upward pressure is least, substantially as described.

LOUIS GODDU.

Witnesses:
G. W. GREGORY,
N. E. C. WHITNEY.